United States Patent
Cardin

(10) Patent No.: US 11,247,204 B2
(45) Date of Patent: *Feb. 15, 2022

(54) SAMPLE PRECONCENTRATION SYSTEM AND METHOD FOR USE WITH GAS CHROMATOGRAPHY

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 776 days.

This patent is subject to a terminal disclaimer.

(21) Appl. No.: 16/168,605

(22) Filed: Oct. 23, 2018

(65) Prior Publication Data
US 2019/0118171 A1    Apr. 25, 2019

Related U.S. Application Data

(60) Provisional application No. 62/576,769, filed on Oct. 25, 2017.

(51) Int. Cl.
*B01L 3/00*    (2006.01)
*G01N 1/40*    (2006.01)
(Continued)

(52) U.S. Cl.
CPC .............. *B01L 3/502* (2013.01); *G01N 1/405* (2013.01); *G01N 1/44* (2013.01); *G01N 30/08* (2013.01);
(Continued)

(58) Field of Classification Search
None
See application file for complete search history.

(56) References Cited

U.S. PATENT DOCUMENTS 4,180,389 A    12/1979    Paul
5,014,541 A    5/1991    Sides et al.
(Continued)

FOREIGN PATENT DOCUMENTS

CN    102393429 A    3/2012
CN    102302886 B    8/2013
(Continued)

OTHER PUBLICATIONS

Final Office Action dated Apr. 23, 2018, for U.S. Appl. No. 15/479,122, filed Apr. 4, 2017, 14 pages.
(Continued)

*Primary Examiner* — Xiaoyun R Xu
(74) *Attorney, Agent, or Firm* — Kubota & Basol LLP

(57) ABSTRACT

The disclosed system and method concentrates and enriches a chemical sample while removing water and/or CO2 prior to analysis, improving detection limits and repeatability of quantitative chemical analysis without the need for cryogenic or sub-ambient cooling. The system can include a valve system, a dewpoint control zone, and a multi-capillary column trapping system (MCCTS). During a first time period, the valve system can couple the dewpoint control zone to the MCCTS. During a second time period, the valve system can couple the MCCTS to the chemical separation column such the dewpoint control zone is bypassed. Excess water included in the sample can condense in the dewpoint control zone as the sample transfers to the dewpoint control zone and MCCTS. When the sample is transferred from the MCCTS to the chemical separation column, the condensed water in the dewpoint control zone is not transferred to a chemical separation column.

18 Claims, 6 Drawing Sheets

(51) Int. Cl.
*G01N 1/44* (2006.01)
*G01N 30/12* (2006.01)
*G01N 30/14* (2006.01)
*G01N 30/46* (2006.01)
*G01N 30/72* (2006.01)
*G01N 30/30* (2006.01)
*G01N 30/20* (2006.01)
*G01N 30/08* (2006.01)
*G01N 30/60* (2006.01)
*G01N 1/22* (2006.01)

(52) U.S. Cl.
CPC ............ *G01N 30/12* (2013.01); *G01N 30/14* (2013.01); *G01N 30/20* (2013.01); *G01N 30/30* (2013.01); *G01N 30/461* (2013.01); *G01N 30/7206* (2013.01); *B01L 2300/0838* (2013.01); *B01L 2300/18* (2013.01); *G01N 1/2214* (2013.01); *G01N 30/6078* (2013.01); *G01N 2001/4033* (2013.01); *G01N 2030/121* (2013.01)

(56) References Cited

U.S. PATENT DOCUMENTS

| | | |
|---|---|---|
| 5,135,549 A | 8/1992 | Phillips et al. |
| 5,141,534 A | 8/1992 | Sacks et al. |
| 5,191,211 A | 3/1993 | Gorman, Jr. |
| 5,392,634 A | 2/1995 | Asano et al. |
| 5,402,668 A | 4/1995 | Murakami et al. |
| 5,449,902 A | 9/1995 | Onishi et al. |
| 5,492,555 A | 2/1996 | Strunk et al. |
| 5,547,497 A | 8/1996 | Klemp et al. |
| 5,596,876 A | 1/1997 | Manura et al. |
| 5,720,798 A | 2/1998 | Nickerson et al. |
| 5,929,321 A | 7/1999 | Bertrand |
| 6,614,228 B2 | 9/2003 | Hofmann et al. |
| 6,632,268 B2 | 10/2003 | Seeley |
| 6,989,129 B2 | 1/2006 | Licklider et al. |
| 7,451,634 B2 | 11/2008 | Gamache et al. |
| 7,642,089 B2 | 1/2010 | Pieper et al. |
| 7,647,812 B2 | 1/2010 | Arnold et al. |
| 7,823,439 B2 | 11/2010 | Fisher |
| 8,143,071 B2 | 3/2012 | Gjerde |
| 8,613,215 B2 | 12/2013 | Lambertus et al. |
| 8,621,912 B2 | 1/2014 | Guieze |
| 9,188,568 B2 | 11/2015 | Ebeler et al. |
| 9,228,984 B2 | 1/2016 | Lu et al. |
| 9,240,311 B2 | 1/2016 | Whitehouse et al. |
| 9,627,188 B2 | 4/2017 | Ariya et al. |
| 2001/0027722 A1 | 10/2001 | Bremer et al. |
| 2005/0124076 A1 | 6/2005 | Tseng et al. |
| 2006/0245975 A1 | 11/2006 | Tipler et al. |
| 2007/0071638 A1 | 3/2007 | Kraiczek et al. |
| 2008/0264491 A1 | 10/2008 | Klee et al. |
| 2008/0289397 A1 | 11/2008 | Hassan et al. |
| 2009/0238722 A1 | 9/2009 | Mora-Fillat et al. |
| 2010/0022764 A1 | 1/2010 | Otoshi et al. |
| 2010/0242579 A1 | 9/2010 | Tipler et al. |
| 2014/0299547 A1 | 10/2014 | Muller-Spath et al. |
| 2015/0233876 A1 | 8/2015 | Dellea et al. |
| 2016/0332141 A1 | 11/2016 | Machida et al. |
| 2017/0284978 A1 | 10/2017 | Cardin |
| 2019/0137458 A1 | 5/2019 | Cardin |

FOREIGN PATENT DOCUMENTS

| | | |
|---|---|---|
| CN | 104792604 A | 7/2015 |
| CN | 108387668 A | 8/2018 |
| EP | 0 597 602 A1 | 5/1994 |
| EP | 0806661 A1 | 11/1997 |
| EP | 2757369 A1 | 7/2014 |
| JP | 7-253421 A | 10/1995 |
| JP | H-11248694 A | 9/1999 |
| JP | 2005-283317 A | 10/2005 |
| JP | 2009-2711 A | 1/2009 |
| JP | 2009-236539 A | 10/2009 |
| JP | 2014-529080 A | 10/2014 |
| JP | 2017-173281 A | 9/2017 |
| WO | WO-2017/176794 A1 | 10/2017 |

OTHER PUBLICATIONS

GL Science. (Date Unknown). "Multipurpose Sampling Thermal Desorption System MSTD258," located at: URL: https://www.glsciences.com/c-product/sample/sa-instruments/multipurpose-samplinq-thermal-desorption-system-mstd258/, 4 pages.
International Search Report dated Jul. 4, 2017, for PCT Patent Application No. PCT/US2017/025993, filed Apr. 4, 2017, six pages.
Materic, D. et al. (Dec. 2015). "Methods in Plant Foliar Volatile Organic Compounds Research," ResearchGate 2018, located at: https://www.researchgate.net/figure/Thermal-desorption-gas-chromatograph-mass-spectrometer-VOC-samples-trapped-onto-TD-tubes fig1 282817384 , 25 pages.
McLaughlin, L. G., et al. (Nov. 28, 1989). "Determination of dexamethasone in bovine tissues by coupled-column normal-phase high-performance liquid chromatography and capillary gas chromatography—mass spectrometry," Drug Testing and Toxicology, NYS College of Veterinary Medicine, Cornell University, 925 Warren Drive, Ithaca, NY 14850 U.S.A. located at: http://www.sciencedirect.com/science/article/pii/S0378434700838037?vla%3Dihub, 19 pages.
Non-Final Office Action dated Dec. 4, 2017, for U.S. Appl. No. 15/479,122, filed Apr. 4, 2017, 12 pages.
Packham, A. J. et al. (Oct. 1989). "Complex Sample Analysis by Cybernetic Multi-dimensional Chromatography," Analytical Proceedings, vol. 26, Department of Instrumentation and Analytical Science, UMIST, Manchester, M60 1QD, located at: http://pubs.rsc.org/-/content/articlelanding/1989/ap/ap9892600336#ldivAbstract, 17 pages.
International Search Report dated Feb. 12, 2019, for PCT Patent Application No. PCT/US2018/057151, filed Oct. 23, 2018, five pages.
International Search Report dated Feb. 12, 2019, for PCT Patent Application No. PCT/US2018/058349, filed Oct. 31, 2018, five pages.
Non-Final Office Action dated Dec. 17, 2018, for U.S. Appl. No. 15/479,122, filed Apr. 4, 2017, 13 pages.
Examiner's Answer to Appeal Brief received for U.S. Appl. No. 15/479,122, dated Apr. 7, 2020, 22 pages.

SAMPLE PRECONCENTRATION SYSTEM AND METHOD FOR USE WITH GAS CHROMATOGRAPHY

CROSS-REFERENCE TO RELATED APPLICATIONS

This application claims the benefit of U.S. Provisional Patent Application No. 62/576,769, filed on Oct. 25, 2017, the entire disclosure of which is incorporated herein by reference in its entirety for all purposes.

FIELD OF THE DISCLOSURE

This relates to a system and method of preconcentrating a sample for subsequent chemical analysis, such as by gas chromatography or gas chromatography-mass spectrometry.

BACKGROUND OF THE DISCLOSURE

Analysis of trace level VOCs and other volatile chemicals by gas chromatography and gas chromatography-mass spectrometry can require preconcentration prior to injection into a chemical analysis device (e.g., GC or GCMS (Gas Chromatograph/Mass Spectrometer)) in order to detect compounds that have concentrations below about 50 PPBv. In some embodiments, GCs operate using a capillary GC column with flow rates in the range of 0.5-3 cc/min, and typical peak widths eluting from the columns of 2-8 seconds wide. As an example, at a flow rate of 2 cc/min, a 6 second wide peak can be contained within 0.2 cc (2 cc/min×0.1 min) of carrier gas as it elutes from the column. Therefore, in this example, the injection volume should be no more than 0.2 cc, otherwise peak broadening and loss of resolution of the lighter compounds can occur. Since some of this peak width is caused by diffusion and "peak spreading" on the column, it can be desirable to limit the volume of carrier gas injected onto the capillary GC column with the sample to about half of this 6-second peak volume (0.2 cc), or 0.1 cc in order to preserve resolution. Loss of resolution can cause lower sensitivity and greater potential for interferences from other chemicals, for example. Poor resolution caused by wide peaks also requires longer runs times in order to further separate compounds in the injection mixture, which can impact productivity while further increasing peak widths, as compounds can experience more diffusion-based band broadening the longer they remain on the column. Good GC methods generally attempt to reduce or minimize peak widths in order to increase or maximize the effectiveness of the analytical technique.

Many chemicals of interest in water, food, beverages, consumer products, and other samples must be detected at levels 1000× lower than the 50 PPB limitation of a 0.1 cc syringe or loop injection device. Compounds present at sub-PPB levels can still pose a toxicity risk, while other trace level compounds can both positively and negatively affect the flavor and odor of consumer products at part per trillion levels. In addition, many trace level markers in breath, blood, and urine are now being considered for diagnosis of various human related conditions and diseases. Therefore, in some embodiments, samples having compounds of interest occurring at these low concentrations require sample enrichment prior to GC injection.

In some embodiments, the sample is desorbed and made mobile using a volume of carrier fluid that is less than 0.1 cc to achieve optimal injection rates. Exemplary volatile chemical analysis techniques offering sensitivities below that of a 0.1 cc syringe or loop injection system are presented below:

Dynamic Headspace (e.g., Purge & Trap)
Static Headspace, loop injection, at elevated temperatures in a salt saturated solution
SPME (Solid Phase Micro Extraction)
VASE (Vacuum Assisted Sorbent Extraction)
Large Volume Loop Injection Although the techniques above can offer sensitivities below (e.g., are sensitive to compounds occurring in lower concentrations in the sample than) those offered by a 0.1 cc syringe or loop injection system, in some embodiments, they generally cannot transfer the sample fast enough to a typical GC column flowing at just 0.5-3 cc/min while maximizing the resolution of lighter compounds. Light chemicals that are trapped or transferred using the techniques above may not deposit and dynamically focus onto a GC column upon injection, but rather can keep moving through the column towards the detector even at the lower, initial starting temperatures during analysis. In some embodiments, this tendency requires that the injection be completed quickly, and, for best chromatographic resolution, within a 0.1 cc volume. Fast injection rates may not be possible using the above-listed sample introduction techniques due to size of the adsorbent bed or due to the initial volume of the sample. Thus, three techniques described below can be used to focus the sample prior to chemical analysis to achieve a faster injection rate.

A first focusing technique involves a cryogenic trap having an internal volume of several microliters, which can be used for analysis of target compounds that occur in very low concentrations (e.g., less than 50 PPB or as low as 5 PPB for 1 cc of sample, 0.5 cc for 10 cc of sample, or as low as 0.05 PPB for 100 cc of sample) in the sample to allow all compounds to "focus" at the head of the GC column. The resulting low volume can be completely desorbed in 1-2 seconds, allowing reduced or minimum band-width, thus improving peak resolution on the GC column.

This approach can have two problems, however. First, liquid nitrogen is falling out of favor in some laboratories due to cost and safety concerns, and, for these reasons and others, many laboratories simply cannot use liquid nitrogen.

Secondly, focusing using liquid nitrogen will retain all of the moisture in the sample, causing interferences during GC and GCMS analysis. Too much water (e.g., approximately 10 cc or more of a gas sample at 100% relative humidity at 25° C.) can suppress the signal in the mass spectrometer, and can often also affect the resolution and peak shape of compounds during gas chromatography. Many gas samples can also contain large amounts of carbon dioxide ($CO_2$) that may not be eliminated using cryogenic focusing traps, which can cause chromatography problems and additional detector suppression. Because of these problems with cryogenic focusing, alternative focusing techniques are desirable in most situations.

A second focusing technique involves using a micro packed trap containing one or more adsorbent beds to further reduce the volume of the sample, followed by subsequent heating and back-flushing onto a GC column, for example. This kind of trap can reduce the amount of water and $CO_2$ in the sample, and can lower the injection volume, but it is not effective at removing all of the moisture from the sample, and may not release the sample fast enough to obtain optimum peak widths on the capillary GC column. These shortcomings can occur because the particle size in these adsorbent traps is typically about 10× larger than the particle size found on the inner surface of capillary columns in order to achieve a reasonable flow rate through the micro packed traps.

Assuming a nearly spherical shape, the internal volume of the adsorbent particles included in micro packed traps can be on the order of 1000× larger than those on the walls of capillary columns because the volume varies by the cube of the radius. This larger particle volume requires a longer period of time for compounds to diffuse out of the particle even at higher desorption temperatures, which in turn increases the peak widths, and can even cause undesirable peak "tailing" as the final 5-20% of the chemicals "bleed" out of the larger particles. Larger particles found in packed traps additionally require a longer period of time to clean them up during a "system bake out" after injection, and are more subject to contamination by high concentration samples than are the small particles on the walls of open tubular capillary columns that have internal volumes 1000× smaller.

A third focusing technique includes performing a "split" injection, for example, by placing a split tee in front of the GC column with a flow out of the split port that is often 10-100× greater than the flow going onto the column. As an example, a split flow of 20× results in 38 cc/min of carrier gas flowing out of the split port when 2 cc/min of carrier gas are flowing onto the chemical separation column. In this example, the sample is injected at a rate of 40 cc/min instead of 2 cc/min, and a total of 4 cc is desorbed through the initial sorbent in just 6 seconds, which can achieve nearly a complete transfer out of the initial adsorbent trap and onto the chemical separation column. In addition, with a 20:1 split, 95% of the water vapor and other matrix components are eliminated, which can reduce the likelihood of chromatographic problems or suppression in the mass spectrometer. The down side of split injections is that 95% of the sample is discarded via the split port, making it more difficult to reach required detection limits because less of the sample is provided to the detector.

As another example, SPME, which is a technique that uses a small fiber to collect sample, may not collect very much water and may desorb relatively fast without focusing or splitting, but can suffer from poor reproducibility in many matrices, and often cannot recover the lighter chemicals of interest.

Thus, there exists a need in the field of chemical analysis for reducing the sample volume low enough to allow injection into the GC using 0.1 cc or less of carrier gas, while removing the water vapor and, in some examples, ethanol and/or CO2. For example, it can be desirable to remove ethanol from a sample when analyzing alcohol-containing beverages. Once the sample volume has been reduced using a means that allows it to be desorbed into 0.1 cc of GC carrier gas or less, the sample can be transferred rapidly to a chemical separation column without performing a split injection, which can result in a sensitivity that is 10-50× greater than that of current split injection techniques. The particles used on the walls of the open tubular columns in the multi-stage capillary trap described below with reference to FIGS. 1-4 can have roughly 1000× less internal volume than those used in packed micro focusing traps, allowing faster release rates supporting far superior chromatographic resolution. Embodiments of a focusing and water management system that performs this function without the need for cryogenic or electronic cooling is described below.

SUMMARY OF THE DISCLOSURE

This relates to a system and method of preconcentrating a sample for subsequent chemical analysis, such as by gas chromatography or gas chromatography-mass spectrometry. The disclosed approach reduces the volume of a gas phase sample prior to chemical analysis, such as by gas chromatography (GC), with reduced loss of volatile chemicals while performing extremely good moisture and CO2 elimination. Injection rates onto a capillary GC column are improved compared to prior techniques, without performing a split injection.

A multi-capillary column trapping system MCCTS including several capillary columns of increasing strength connected in series are optionally used to trap and "focus" chemicals over a wide range of boiling points, such as from −50° C. to 400° C. or higher. After focusing the compounds into a smaller volume, in some embodiments, the MCCTS is purged with a carrier fluid, such as an inert or non-reactive gas, in the forward flow direction to partially, substantially, or fully eliminate any remaining air or water vapor, and then the MCCTS is quickly heated and back-flushed with the carrier fluid to provide a fast injection into the chemical analysis device, such as a GC. The MCCTS optionally reduces the volume enough to allow direct, split-less injection of a sample into a low flow capillary chemical separation column operating at 0.5-3 cc/min.

In some embodiments, the ability to inject the sample quickly enough to reduce or minimize bandwidth allows high resolution chemical analysis, such as gas chromatography, to be performed without an additional split flow and increases or maximizes sensitivity. A dewpoint control zone prior to the MCCTS optionally prevents or impedes water from reaching the saturation point while passing through the MCCTS, reducing or eliminating the chance for water condensation during focusing and water removal. Some embodiments can be used to focus samples obtained from the thermal desorption of larger primary adsorbent traps, a volume of gas as obtained from a sample loop, a gas sample directly pulled in from a Tedlar bag or other container, or from other sources. Some embodiments can be used for dozens of applications, including the analysis of water and soil samples for VOCs to maximize sensitivity, for analysis of aromas, flavors, and fragrances in liquid and solid food samples, the analysis of samples from Tedlar bags used in dozens of gas sampling applications, the analysis of odors in a variety of synthetics and natural products and the analysis of chemical markers, drugs, or metabolites in breath, blood, urine, or tissue samples.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

Figure 1A:
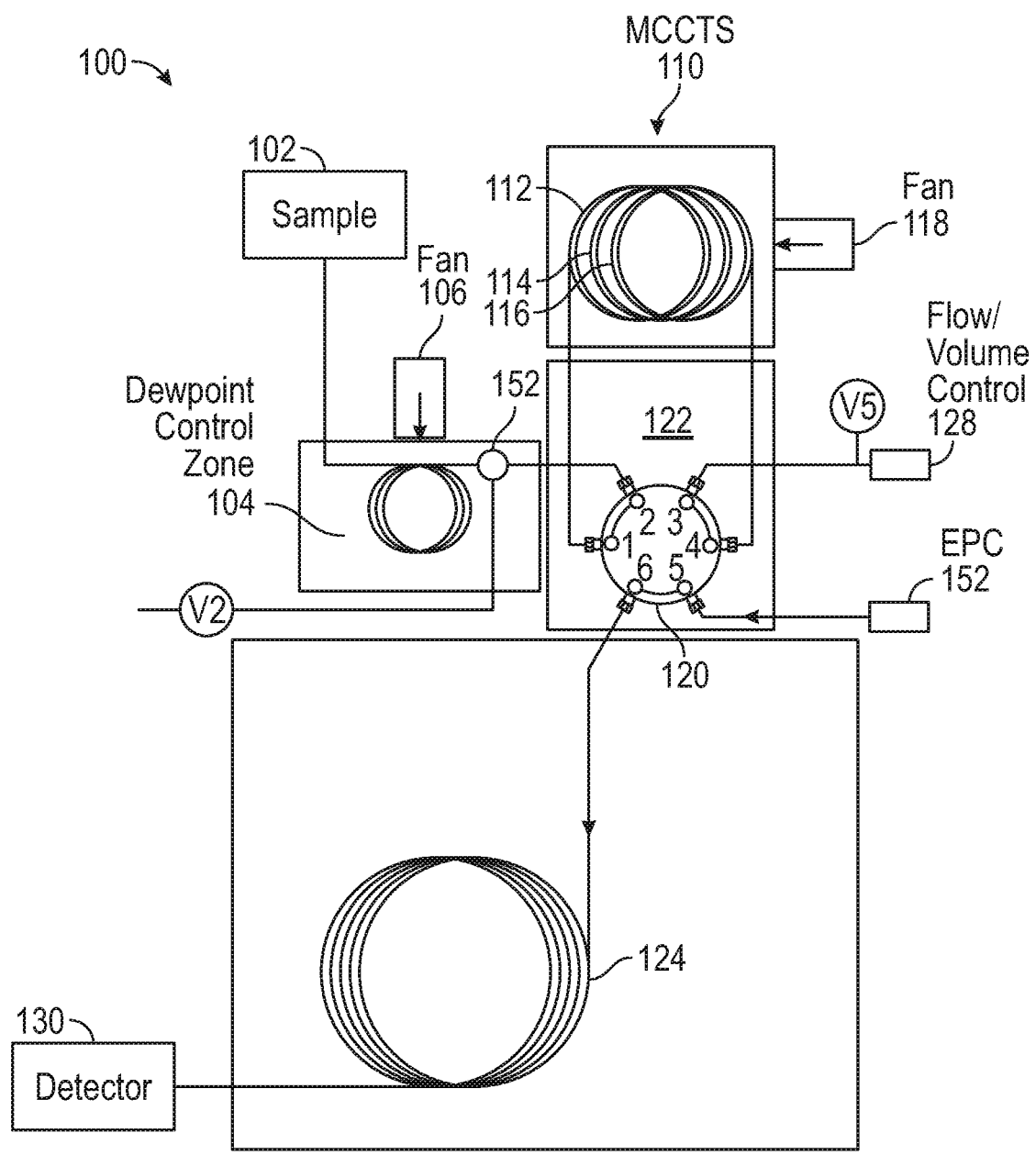
FIGS. 1A-B illustrate an exemplary system according to some embodiments of the disclosure.
Figure 1B:
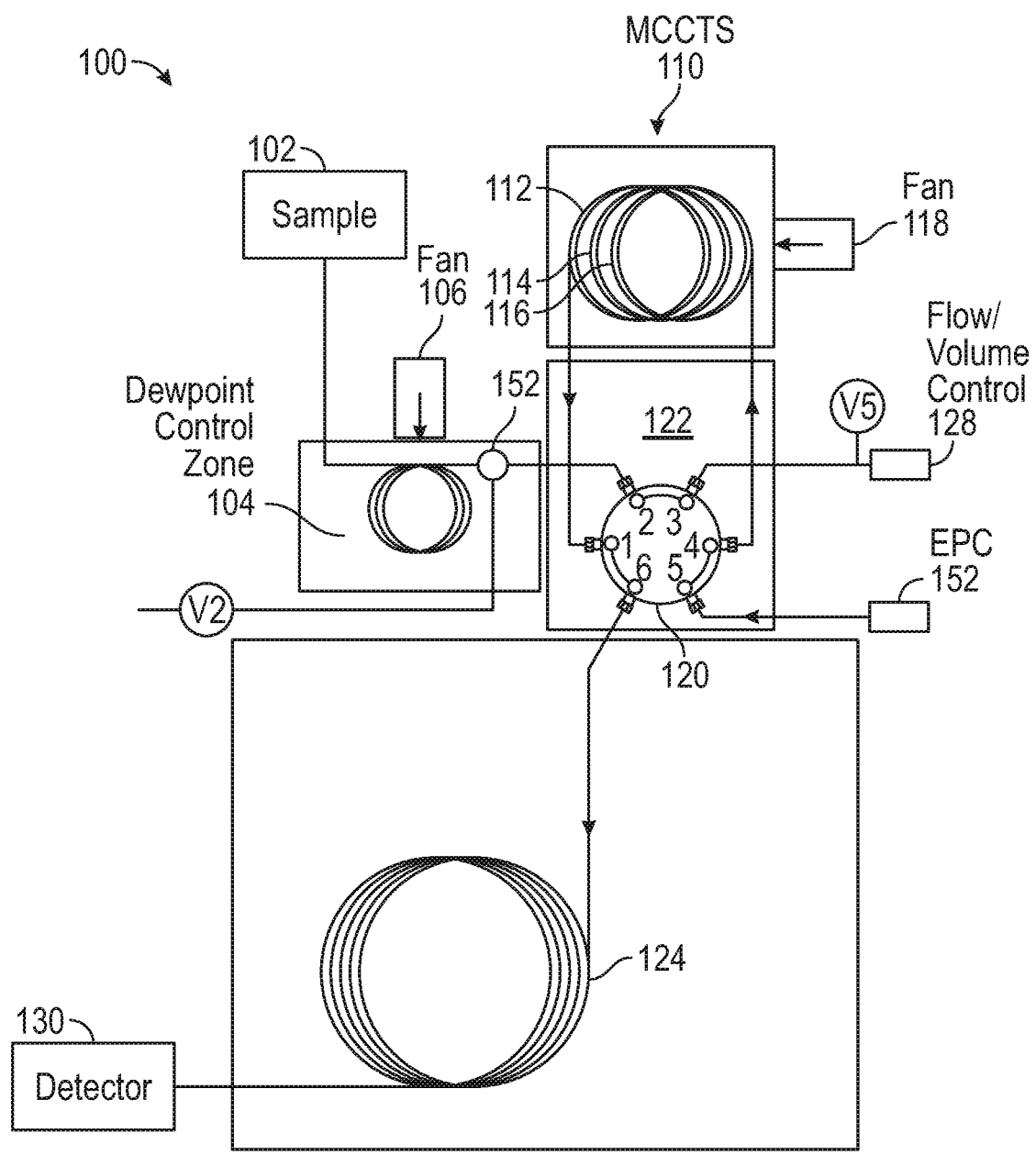

FIGS. 1A-B illustrate an exemplary system 100 according to some embodiments of the disclosure. System 100 can be used to focus a sample in a way that allows it to be released into 0.1 cc of carrier gas during desorption for rapid, split-less injection into a chemical separation column (e.g., a GC column) while eliminating water and any carbon dioxide in the sample prior to injection.

As shown in FIGS. 1A-1B, the system 100 optionally includes a sample 102, a dewpoint control zone 104, a fan 106 proximate to the dewpoint control zone 104, a six-position rotary valve 120 situated in heater 122, a multi-capillary column trapping system (MCCTS) 110 including a first column 112, a second column 114, and a third column 116, a fan 118 proximate to the MCCTS 110, at least two valves V2 and V5, flow/volume control 128, electronic pressure controller (EPC) 152, a chemical separation column 124, such as a GC column, and a detector 130, such as an MS or other suitable detector. The system 100 can further include one or more processors (e.g., controllers, microprocessors, computers, computer systems, etc.) (not shown) running software and/or instructions housed on a non-transitory computer-readable medium for controlling the operation of one or more components of the system 100.

Rotary valve 120 can be configured in a first position illustrated in FIG. 1A that facilitates forward flow of a sample and carrier fluid through the dewpoint control zone 104 and MCCTS 110 in a forward flow direction. Rotary valve 120 can also be configured in a second position illustrated in FIG. 1B that facilitates reverse flow of the sample and a carrier fluid from the MCCTS into the chemical separation column 124 and into the detector 130. In some embodiments, once the sample is transferred to the chemical separation column 124, the rotary valve 120 can be configured in the first position illustrated in FIG. 1A while the MCCTS 110 and dewpoint control zone 104 are heated and backflushed to prepare the system 100 for the next run.

A sample 102 having a volume in the range of 0.2 to 50 cc is optionally introduced into the system 100 as shown in FIGS. 1A-B. Sample 102 is optionally a gas phase sample. This gas phase sample can be derived from one of several sources, including a large volume loop, directly from a gas container, a dynamically sampled adsorbent trap (e.g., Purge & Trap or other), a diffusive extraction device such as SPME, or a diffusive vacuum extraction device (e.g., VASE (described below with reference to FIGS. 2-4) or other) that also retains the sample after extraction. An exemplary diffusive extraction device is described below with reference to FIGS. 2-3. Adsorbent traps, including diffusive extraction devices and other types of adsorbent traps, can be preheated before starting the flow of a carrier fluid (e.g., which can be controlled by EPC 358 illustrated in FIGS. 3A-B). In some embodiments, preheating reduces or minimizes the volume of desorption gas needed to desorb the sample 102 from the adsorbent in which it is held.

In some embodiments, upon desorption or delivery of the sample 120 from the sample source, the 0.2 to 50 cc of sample flows through a dewpoint control zone 104. The dewpoint control zone 104 optionally includes a partially, substantially, or fully inert tube or other column placed in a heater or other temperature-controlled zone. The tube of the dewpoint control zone 104 can have a length in the range of 2 to 24 inches (0.05 to 0.6 meters). This length can be shorter than the lengths of the columns included in the MCCTS 110 described below, as the lengths of those columns can be 11 to 120 inches (0.3 to 3 meters). In some embodiments, the tube of the dewpoint control zone 104 can include a weak coating (for example, Polydimethylsiloxane) configured to trap heavy compounds that are not of interest to the analyst. These trapped heavy compounds can be eliminated during heated backflushing of the Dewpoint Control Zone 104 as will be described later. Fan 106, which is proximate to the dewpoint control zone 104, is optionally operable to cool the dewpoint control zone 104 from an elevated temperature (e.g., a temperature in the range of 100 to 300 ° C. during final bake out of the system) to a cooler temperature (e.g., a temperature in the range of 25 to 35 ° C. when transferring the sample from the sample source to the MCCTS 110 and removing excess water in the process) as appropriate for operation of system 100.

When the sample is drawn or desorbed from the sample container, the dewpoint control zone is optionally at a temperature in the range of 25-35° C. In some embodiments, the tube or column of the dewpoint control zone 104 can limit the amount of water that can be maintained in the gas phase in the dewpoint control zone 104. In some embodiments, excess water can be temporarily or permanently separated from the rest of the chemicals of the sample that continue to the MCCTS trap 110. The excess water can remain in the dewpoint control zone 104 until the system is baked out once all compounds of interest are transferred to the chemical separation column 124. During system bake-out, a heater can heat the dewpoint control zone 104 above 100° C. to evaporate the water, allowing it to flow in an inverse direction towards the sample inlet 102. Additionally or alternatively, V2 can be turned on to push the water vapor out of dewpoint control zone 104 while pushing water vapor and air out of MCCTS 110 prior to transferring the sample to chemical separation column 124.

The MCCTS 110 optionally includes multiple open tubular capillary columns 112, 114, and 116, which can be large bore capillary columns, arranged in series in order of adsorptive strength; with the weakest column 112 first and the strongest column 116 last. In some embodiments, the MCCTS 110 includes a different number of open tubular capillary columns, such as 2 or 4 columns. The MCCTS 110 includes more columns than the number of columns of the dewpoint control zone 104, which generally includes one column. The use of multiple columns of increasing chemical affinity allows the MCCTS 110 to trap a wide range of sample compounds in some embodiments. In some embodiments, each stage has an affinity that is 3 to 30 times stronger than the stage proceeding it (e.g., column 114 is 3 to 30 times stronger than column 112 and column 116 is 3 to 30 times stronger than column 114). The columns 114, 116, and 118 are optionally short enough to keep the trapped chemicals sufficiently concentrated to allow their fast injection into the chemical separation column 124. For example, columns 112, 114, and 116 can have lengths in the range of 11 to 120 inches (0.3 to 3 meters). Thus, the total combined length of MCCTS 110 can be 0.3 to 3 meters. As an example, column 112 can be a 0.5 m PDMS WCOT (wall-coated open tubular) column, column 114 can be a 0.5 mm PLOT Q (porous layer open tubular) column, and column 116 can be a 0.5 m carbon molecular sieve PLOT column. Other columns with similar retention strengths as the coatings mentioned would be suitable alternatives. A fast injection rate can be needed to reduce or minimize peak widths on the chemical separation column 124, thereby providing both taller peaks in the chromatogram with greater signal to noise ratios, while allowing peaks to separate or resolve from each other to make identification and quantitation more reliable and accurate. Faster injection rates and narrow peaks on-column can also require less separation of peak centroids to fully resolve the peaks from each other, allowing shorter columns to be used and subsequently faster analysis times.

During the transfer of the sample 120 from the dewpoint control zone 104 to the MCCTS 110, the MCCTS 110 can be at a temperature 5-10° C. higher than the temperature of the dewpoint control zone 104. In some embodiments, this difference in temperature causes the water vapor inside the MCCTS 110 to remain in the gas phase such that the water vapor passes through the MCCTS 110 without condensing. After trapping the sample in the MCCTS 110, an additional small volume of carrier fluid, such as helium, can be purged through the MCCTS 110 to eliminate fixed gases (e.g., air, CO2, etc.) and any residual water vapor to achieve partial, substantial, or full elimination of water in the sample. When the MCCTS 110 is purged in this way, one or more target compounds for analysis optionally remain on the MCCTS 110.

While the rotary valve 120 is in the position illustrated in FIG. 1A, the volume passing from the dewpoint control zone 104 into the MCCTS 110 can be controlled by a flow controller 128. In some embodiments, the flow/volume control 128 can be a time integrating flow controller such as a mass flow controller, a fixed restrictor where desorption occurs for a set period of time, or a combination of a flow restrictor, pressure sensor, and reservoir of known volume where a change in pressure is easily equated to a known desorb volume. After collecting the required volume from the sample 102, a drying gas such as helium can be introduced at junction 152, which can be after the dewpoint control zone 104 and before the MCCTS 110 by opening valve V2. The flow of the drying gas can cause the remainder of the moisture, CO2, or air left in the MCCTS trap 110 to be purged out before desorption into the GC. The drying gas can also be used to backflush the Dewpoint Control Zone while backflushing and heating to eliminate the condensed water. Just prior to moving the valve and while in the configuration illustrated in FIG. 1A, the MCCTS trap 110 can be preheated under no flow conditions to increase the injection rates of the sample 102 onto the chemical separation column 124 to achieve improved or optimum chromatographic resolution.

When the rotary valve 120 is moved to the position illustrated in FIG. 1B, the MCCTS trap 110 can be backflushed to the chemical separation column 124 while performing a rapid, splitless injection of the sample onto the chemical separation column 124. Desorption from the MCCTS trap 110 can occur for as little as 30 seconds to ensure the heaviest compounds are injected and that the more highly volatile compounds are injected within a few seconds to minimize their bandwidth on the GC column.

After the injection, the rotary valve 120 can be moved back to the LOAD position as shown in FIG. 1A, and V5 can be turned on to backflush the MCCTS trap 110 and the dewpoint control zone 104 while both are heated. After backflushing is complete, the MCCTS trap 110 and the dewpoint control zone 104 can be cooled to their starting temperatures. In some embodiments, upon cooling of the two zones, the system 100 can start focusing the next sample while the GC or GCMS is analyzing the previously injected sample to increase sample throughput rates, resulting in increased lab productivity. The focusing and trapping operation can be repeated until all samples in a given batch of samples are analyzed.

As previously discussed, sample 102 illustrated in FIGS. 1A-B can be collected in a variety of ways. For example, the sample 102 can be derived from a large volume loop, directly from a gas container, a dynamically sampled adsorbent trap (Purge & Trap or other), or a diffusively sampled adsorbent trap (VASE or other). In some embodiments, sample 102 is collected and delivered to system 100 using a diffusive sample extraction device, such as a Vacuum Assisted Sorbent Extraction (VASE) device. An exemplary diffusive sample extraction device 200 according to some embodiments of the disclosure will now be described with reference to FIGS. 2-3.

Figure 2:
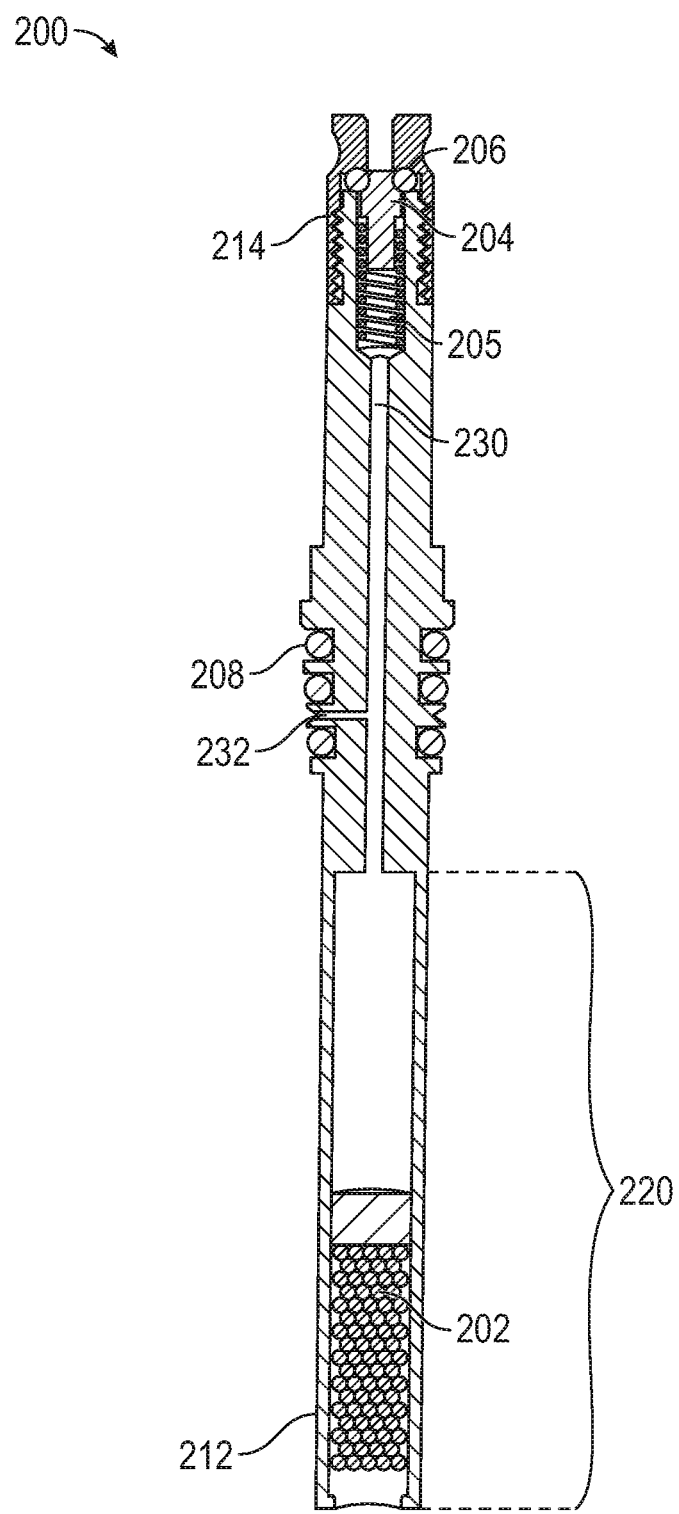
FIG. 2 illustrates an exemplary diffusive extraction device according to examples of the disclosure.

FIG. 2 illustrates an exemplary diffusive extraction device 200 according to examples of the disclosure. As an example, diffusive extraction device 200 can have a diameter between ⅟32 in. and ⅜ in. (e.g., the external or internal diameter of the sample extraction device). In some examples, other dimensions are possible. Diffusive extraction device 200 can comprise a tube-like structure, for example, that includes various channels and/or cavities as will be described below. In some examples, diffusive extraction device 200 can be fabricated from stainless steel or another suitable material (e.g., a material that is substantially inert). All or part of the surface of diffusive extraction device 200 can be coated with a chemical vapor deposition (CVD)-deposited ceramic to increase the inertness of the diffusive extraction device 200, for example. Other coatings that similarly increase the inertness of the diffusive extraction device 200 can similarly be used.

Diffusive extraction device 200 can include lower cavity 220. In some examples, the lower cavity 220 can contain one or more sorbents 202, which can include, for example, an adsorbent and/or an absorbent. The sorbent can be a polymeric adsorbent such as Tenax or Tenax TA, an amorphous carbon adsorbent, a short piece of 0.53 mm ID porous layer open tubular (PLOT) column ranging in composition from polydimethylsiloxane (PDMS), PLOT Q, and/or carbon molecular sieve, or some other sorbent that can be chosen based on the sample(s) to be collected by the diffusive extraction device 200, for example. As will be described below, in some examples, sorbent 202 can be selected to collect a sample for analysis. In some examples, the sorbent 202 can be located towards an extraction end 212 of the diffusive extraction device 200. That is to say, sorbent 202 can be closer to the extraction end 212 of the diffusive extraction device 200 than it is to a valve end 214 of the diffusive extraction device. During sample extraction, extraction end 212 of the diffusive extraction device 200 can be open to the environment of the sample extraction device such that the sample being collected can enter lower cavity 220, and can adsorb or absorb to sorbent 202, as will be described in more detail below.

At the valve end 214 of the diffusive extraction device 200 (e.g., opposite extraction end 212 of the diffusive extraction device 200), the diffusive extraction device 200 can include a sealing plunger 204, a spring 205, and an internal seal 206, for example. The internal seal 206 can be a fluoroelastomer seal, a perfluoroelastomer seal, or any other suitable seal, for example. In some examples, sealing plunger 204 and internal seal 206 can selectively restrict fluid (e.g., gas, liquid, etc.) flow through internal channel 230 between sealing plunger 204/internal seal 206 and lower cavity 220/sorbent 202. For example, when sealing plunger 204 is pressed up against seal 206, fluid flow through diffusive extraction device 200 can be restricted, and when sealing plunger 204 is moved away or otherwise separated from seal 206, fluid flow through diffusive extraction device 200 may be unrestricted. In some examples, sealing plunger 204 can be tensioned via spring 205 against seal 206 such that in a default configuration, sealing plunger 204 can be pressed up against seal 206 and fluid flow through diffusive extraction device 200 can be restricted. In some examples, spring 205 can be fabricated from a non-reactive material, such as 316 stainless steel coated with a ceramic material using a chemical vapor deposition (CVD) process. Fluid flow (e.g., air being drawn into a vacuum source) through diffusive extraction device 200 can be allowed by causing sealing plunger 204 to move away from seal 206 (e.g., via mechanical means such as a pin from above, or other means). For example, a vacuum source can be coupled to the diffusive extraction device 200 at the valve end 214 to open sealing plunger 204 and draw a vacuum through sealing plunger 204, internal channel 230, and lower cavity 220. Additionally, in some examples, sealing plunger 204 can remain open (e.g., during continuous vacuum evacuation) to evaporate unwanted matrix, such as water or alcohol, from the sample through sorbent 202.

As an example, during a sample extraction process in which a sample can be collected in diffusive extraction device 200, a vacuum can be drawn through sealing plunger 204, internal channel 230 and lower cavity 220 to facilitate sample collection by sorbent 202 in lower cavity 220. After the sample has been collected by the diffusive extraction device 200, the sealing plunger 204 can be remain closed (e.g., as it can be during sample collection) and can isolate the sample from the environment, allowing the sample to be stored in the diffusive extraction device 200 between extraction and analysis. For example, spring 205 can cause the sealing plunger 204 to remain closed in the absence of a mechanical force to open sealing plunger 204.

During the chemical analysis process, such as the chemical analysis process described above with reference to FIGS. 1A-B or the chemical analysis process described below with reference to FIGS. 3-4, a carrier fluid can be drawn through port 232 into internal channel 230 and lower cavity 220 while desorbing the sample (e.g., through a dewpoint control zone 104). In some examples, port 232 can be a channel in fluid communication with lower cavity 220 and the outside of diffusive extraction device 200. Preferably, the open end of port 232 can be located between external seals 208 so that port 232 can be sealed when the diffusive extraction device 200 is sealed against another object (e.g., a desorption device or sample vial), for example. In some examples, other locations of port 232 on diffusive extraction device 200 are possible.

The diffusive extraction device 200 can further include one or more external seals 208, for example. The external seals 208 can be made of an elastomeric material and can be fluoroelastomer seals or perfluoroelastomer seals. In some examples, the external seals 208 can be Viton™ seals or other suitable seals. The external seals 208 can be located externally on diffusive extraction device 200 between ends 212 and 214. The external seals 208 can include one or more gaskets or o-rings fitted around the outside of the diffusive extraction device 200, for example. In some examples, the external seals 208 can be used to form a seal between diffusive extraction device 200 and a sample vial into which diffusive extraction device 200 can be inserted during a sample extraction process, and/or to form a seal between diffusive extraction device 200 and desorption device 354 into which diffusive extraction device 200 can be inserted during a sample desorption process, such as part of the chemical analysis process described below with reference to FIGS. 3-4.

Figure 3A:
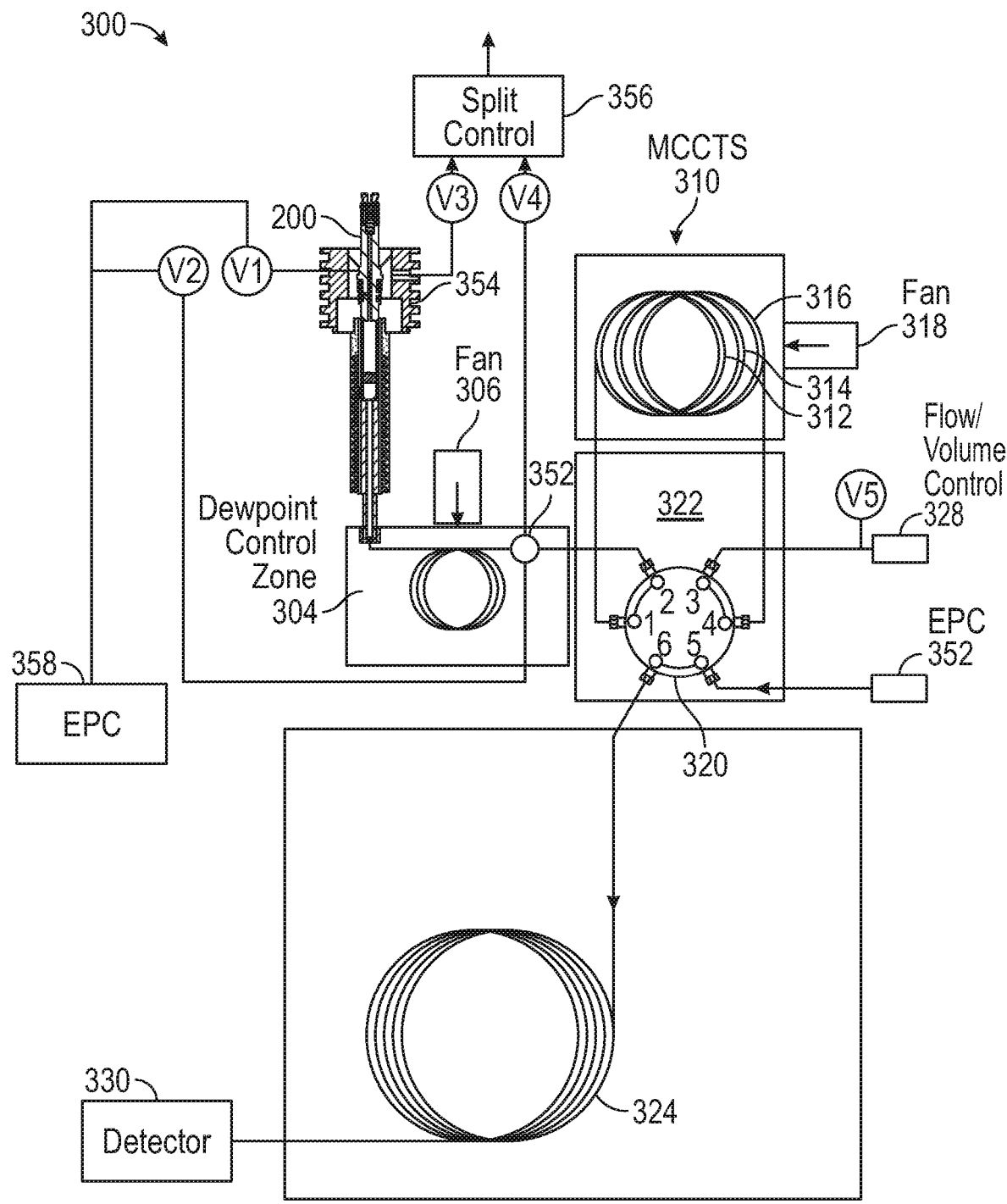
FIGS. 3A-B illustrate a chemical analysis system including a diffusive sample extraction device 200 according to some embodiments of the disclosure.
Figure 3B:
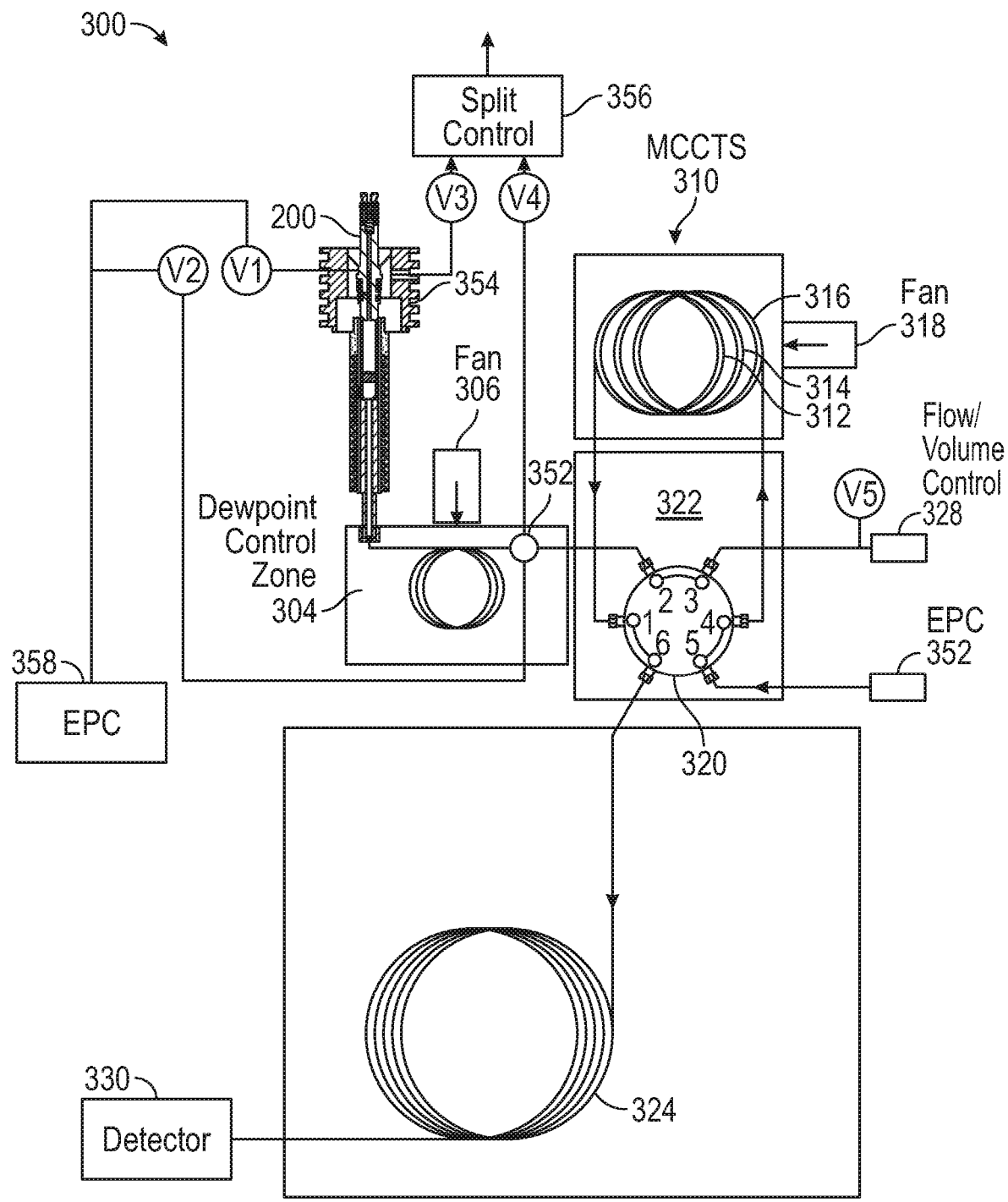

FIGS. 3A-B illustrate a chemical analysis system 300 including a diffusive sample extraction device 200 according to some embodiments of the disclosure. System 300 can include many of the same parts included in system 100 that function in the same ways as those described with respect to system 100, described above with reference to FIGS. 1A-B. For the sake of brevity, those details are not all repeated here.

As shown in FIGS. 3A-B, the system 300 optionally includes a diffusive extraction device 200 (e.g., containing a sample that is optionally similar to sample 102), a dewpoint control zone 304 (e.g., similar to dewpoint control zone 104), a fan 306 (e.g., similar to fan 106) proximate to the dewpoint control zone 304, a six-position rotary valve 320 (e.g., similar to rotary valve 120) situated in heater 322 (e.g., similar to heater 122), a multi-capillary column trapping system (MCCTS) 310 (e.g., similar to MCCTS 110) including a first column 312, a second column 314, and a third column 316, a fan 318 (e.g., similar to fan 118) proximate to the MCCTS 310, at least five valves V1, V2, V3, V4, and V5, flow/volume control 328 (e.g., similar to flow/volume control 128), electronic pressure controller (EPC) 352 (e.g., similar to EPC 152), a chemical separation column 324 (e.g., similar to chemical separation column 124), such as a GC column, and a detector 330 (e.g., similar to detector 130), such as an MS or other suitable detector. In some embodiments, system 300 optionally additionally includes thermal desorption device 354, EPC 358 which can provide a carrier fluid, and split control 356. The system 300 can further include one or more processors (e.g., controllers, microprocessors, computers, computer systems, etc.) (not shown) running software and/or instructions housed on a non-transitory computer-readable medium for controlling the operation of one or more components of the system 300.

The system 300 optionally acts as a focusing device for an "in-vial" diffusive sample enrichment technique. During sample extraction, chemicals in a liquid or solid sample transfer into the adsorbent of the diffusive extraction device 200 for a set period of time, which can extract many chemicals to nearly 100%. The sample extraction process can be accelerated by placing a vacuum on the sample vial, which can be done through the adsorbent of the diffusive extraction device 200, such as by coupling a vacuum source to valve end 214 of the diffusive extraction device 200, as described above with reference to FIG. 2. When using a vacuum, this procedure has been described as "Vacuum Assisted Sorbent Extraction", or VASE.

After sample extraction, the diffusive extraction device 200, optionally called a Sorbent Pen, is inserted into a thermal desorber 354. Upon preheating the diffusive extraction device 200, an inert gas (e.g., controlled by EPC 358) such as helium or nitrogen is directed through the diffusive extraction device 200 by opening V1 to recover the trapped chemicals along with any co-collected water. Excess water condenses in the dewpoint control zone 304 while the rest of the desorbed sample flows to and is retained by the MCCTS focuser 310. After purging the remaining water out of the MCCTS focuser 310 using dry helium through V2 and as delivered through junction 352, the MCCTS focuser can be preheated under zero flow prior to rotating the 6-port, 2-position valve to affect a split-less injection into the GC or GCMS as shown in FIG. 3B.

Figure 4:
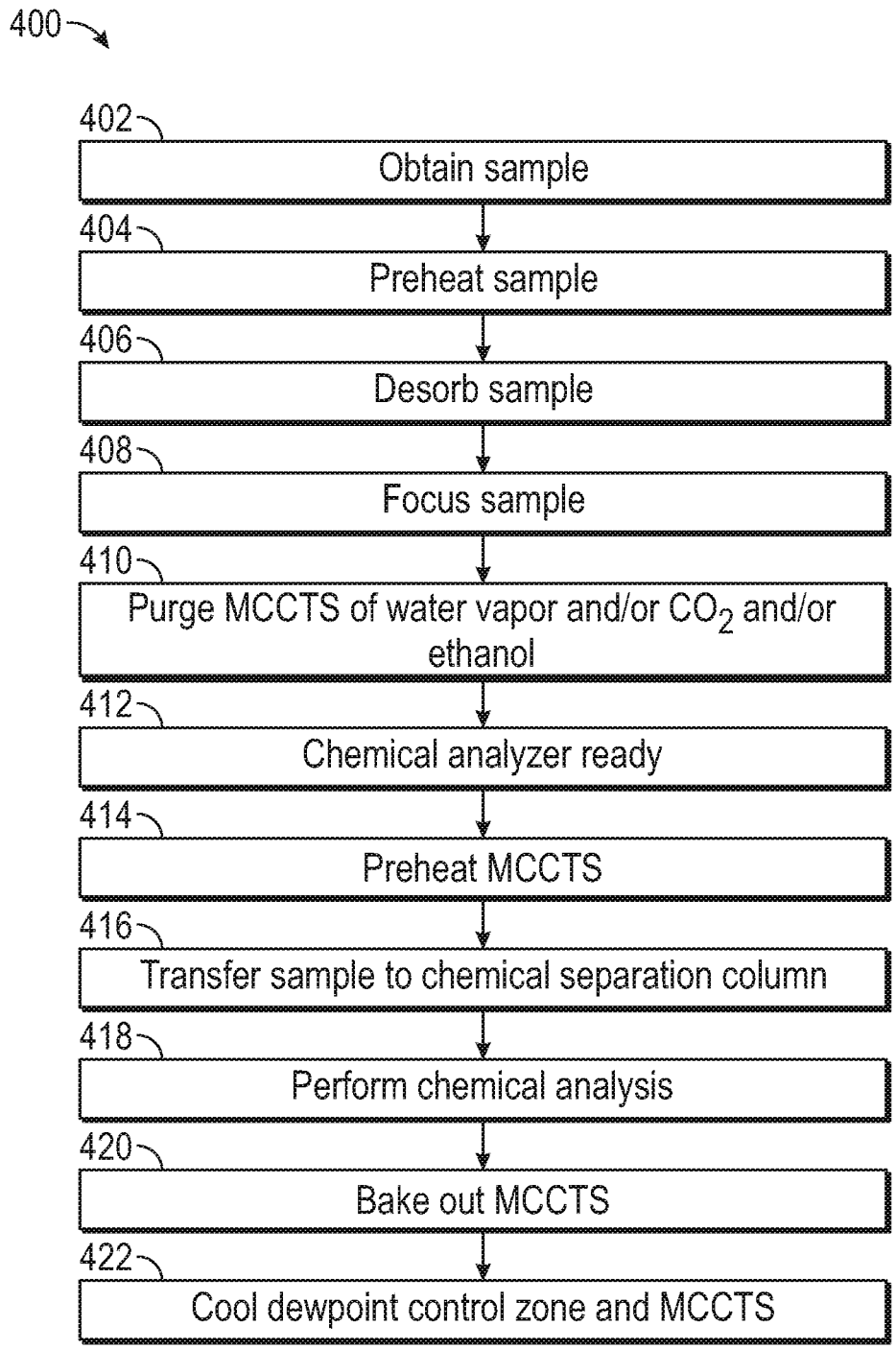
FIG. 4 illustrates an exemplary process for enriching and analyzing a sample using system according to some embodiments of the disclosure.

FIG. 4 illustrates an exemplary process 400 for enriching and analyzing a sample using system 100 or 300 according to some embodiments of the disclosure. In some embodiments, one or more processors (e.g., controllers, microprocessors, computers, computer systems, etc.) (not shown) running software and/or instructions housed on a non-transitory computer-readable medium can control the operation of one or more components of the system 100 or 300 when performing process 400.

In some embodiments, a sample is obtained 402. The sample is optionally trapped using diffusive extraction device 200, such as within the headspace of a vial. After trapping, as shown in FIGS. 3A-B, the diffusive extraction device 200 can be inserted into thermal desorption device 354. In some embodiments, other trapping techniques, such as those discussed above, are possible.

Once the sample (e.g., sample 102 or a sample held in a diffusive extraction device 200) is coupled to system 100 or 300, the sample is optionally preheated 404 under no flow conditions to allow faster release into the dewpoint control zone 104 or 304 and MCCTS 110 or 310. The preheat temperature can be between 100 and 300° C. In some embodiments, heating the sample comprises heating the thermal desorption device 354 into which the diffusive extraction device 200 is inserted.

The sample is desorbed 406 from the diffusive extraction device 200 or from another sample container, as shown in FIGS. 1A-B, using a carrier fluid (e.g., controlled by EPC 358), which can be an inert gas such as helium. To desorb the sample, V1 is turned on and the flow/volume control system 128 or 328 is turned on to measure the volume of gas desorbed through the diffusive extraction device 200 or through (or from, in the case of a gas phase sample, as will be described) another sample container used with system 100. In some embodiments, such as when a gas sample is retained in a Tedlar bag, canister, gas phase process stream, or gaseous headspace above a liquid or solid (e.g., when the gas sample is not retained in a sorbent), the sample is not desorbed using a carrier fluid. Rather, in such embodiments, the sample is pulled through the dewpoint control zone 104 and the MCCTS 110 using, for example, flow/volume control 128 or 328, which can measure the volume of the unretained gases (e.g., fixed gases and uncondensed water vapor). Pulling the sample through the dewpoint control zone 104 or 304 and MCCTS 110 or 310 can require a vacuum pump, as many samples are at atmospheric pressure or even below atmospheric pressure, and differential pressure is needed from high to low pressure to effect the mass transfer of a gas. That is to say, system 100 or 300 optionally includes a vacuum pump at the position of flow/volume control 128 or 328 for this purpose. It should be understood that although the gas sample in these embodiments is not "desorbed" per se, step 406 includes transferring the sample from the sample container by pulling a gas phase sample from the sample container using flow/volume control 128 or 328 and possibly a vacuum pump as described. The volatile chemicals of the sample can pass through the dewpoint control zone 104 or 304. During this time, the dewpoint control zone 104 or 304 is optionally at a temperature of 25-35° C. In some embodiments, the temperature of the dewpoint control zone 104 or 304 causes the excess water included in the sample to condense, which prevents condensation in the MCCTS 110 or 310.

In some embodiments, the dewpoint control zone 104 or 304 and MCCTS 110 or 310 focus 408 the sample. The dewpoint control zone 104 or 304 optionally regulates the rate at which water can be transmitted into the MCCTS 110 or 310. For example, if the dewpoint control zone 104 or 304 is at a temperature of 25° C., then the relative humidity will adjust to 100% at 25° C., with excess water condensing out, at least temporarily. The effluent from the dewpoint control zone 104 or 304 can be delivered through a rotary valve 120 or 320 to the MCCTS 110 or 310, which is held at a temperature typically 5-10° C. higher than the temperature of the dewpoint control zone 104 or 304, but often times 10° C. higher. For example, if the dewpoint control zone 104 or 304 is at a temperature of 25° C., and the MCCTS 110 or 310 is at a temperature of 35° C., then the relative humidity of the gas stream will drop from a maximum of 100% relative humidity in the dewpoint control zone 104 or 304 to just 55%-70% relative humidity in the MCCTS 110 or 310, which is low enough to prevent any condensation of water in the MCCTS.

Flow optionally continues as long as needed to transfer all of the volatile chemicals through the dewpoint control zone 304, with collection in the MCCTS 310. In some embodiments, this transfer requires 4-20 cc of gas, but even larger volumes of gas can be passed through the MCCTS depending on which chemicals are important to recover. That is, if recovery of the lightest chemicals are not important, than volumes up to 50 cc or more can be collected. The capillary columns 312, 314, and 316 used in the MCCTS 310 are selected such that their length and strength (e.g., chemical affinity to one or more compounds of interest in the sample) to retain all compounds of interest, while allowing fast release upon desorption.

In some embodiments, after trapping the sample in the MCCTS 110 or 410, the MCCTS 110 or 410 is purged of water vapor and/or $CO_2$ and/or ethanol. Flow through the dewpoint control zone 104 or 304 is optionally stopped, and then valve V2 is optionally turned on to send an inert gas, such as dry helium, through the MCCTS 110 or 310. During this process, the flow of the inert gas drives off the remaining water and/or $CO_2$ and/or ethanol still on the MCCTS 110 or 310 using as little as 10 cc of the inert gas.

All volumes can remain low enough to prevent breakthrough of the lightest compounds of interest for analysis. In some embodiments in which the sample contains high concentrations of alcohols, a larger volume of the inert gas can be used to remove ethanol and other alcohols as well as the water vapor and $CO_2$ prior to injection into the chemical separation column 324. Alternatively, other columns or column lengths can be chosen in the MCCTS 110 or 310 to allow easier elimination of ethanol while still retaining other compounds of interest. For example, the last column with the strongest compound affinity can either be shortened or eliminated, and the first two stages potentially increased to allow easier elimination of ethanol while retaining all heavier compounds of interest prior to backflushing into the GC up injection.

Before transferring the sample to the chemical separation column 124 or 324, as will be described below, the chemical analyzer (e.g., a subsystem of system 100 or 300 that includes one or more of chemical separation column 124 or 324 and/or detector 130 or 330) generates 412 a READY signal. Until the READY signal is generated, all flows are optionally stopped. In some embodiments, the chemical analyzer includes a GC, a GC-MS, or another chemical analyzer suitable for the analysis to be performed.

When the chemical analyzer provides the typical contact closer READY signal, the MCCTS 110 or 310 is preheated 414 to the injection temperature (e.g., 100 to 300° C.) with no gas flowing through it. Preheating the MCCTS 110 or 310 in this way can allow a very fast injection rate once a desorption flow is introduced. While heating the MCCTS 110 or 310 to its preheat temperature, rotary valve 120 or 320 is moved to its other flow state illustrated in FIG. 1B or FIG. 3B.

In some embodiments, the sample is transferred 416 to the chemical separation column 124 or 324 while the MCCTS 110 or 310 remains at its preheat temperature. With the rotary valve 120 or 320 in the flow state illustrated in FIG. 1B or 3B, the MCCTS 110 or 310 is optionally back-flushed using the carrier fluid to deliver the concentrated sample rapidly to the chemical separation column 124 or 324, and then to the detector 130 or 330. The detector 130 or 330 detects the compounds exiting the chemical separation column 124 or 324 to perform 418 the chemical analysis.

In some embodiments, an additional split tee can be added between the rotary valve 120 or 320 and the chemical separation column 124 or 324 for purposes of reducing the amount of sample delivered into the chemical separation column 124 or 324 and then to the detector 130 or 330. In some embodiments, splitting in this manner can enable the system 100 or 300 to analyze larger sample concentrations without overloading the chemical separation column 124 or 324 or detector 130 or 330. However, splitting is not needed to obtain a rapid injection rate or for water elimination. Overloading of the chemical separation column 124 or 324 or detector 130 or 330 can also be prevented by diluting or using less of the original sample to be analyzed and forgoing the split tee prior to the chemical separation column 124 or 324.

After injecting the sample into the chemical separation column 124 or 324, the rotary valve 120 or 320 is optionally returned to the flow configuration shown in FIG. 1A or FIG. 3A. Valve V5 is optionally turned on to further back flush and bake out 420 the MCCTS 110 or 310, and V3 is turned on while heating the dewpoint control zone 304 to over 100° C. to eliminate any remaining water or sample matrix from the system 100 or 300 in preparation for the next analysis. In some embodiments, the MCCTS 110 or 310 and dewpoint control zone 104 or 304 are heated to a temperature in the range of 100 to 300 ° C. during bake-out. Although V3 is not shown in FIGS. 1A-1B, in some embodiments, system 100 includes a similarly placed valve for this purpose.

After a bake out period, the dewpoint control zone 104 or 304 and the MCCTS 110 or 310 are again cooled 422 to their trapping temperatures, and the next sample, or a calibration standard, or a blank is desorbed and stored on the MCCTS 310 until the chemical analysis device sends a READY signal for the next sample to be injected. The process can be repeated until all samples are analyzed. The ability to prepare the next sample for injection while the previous sample is running increases laboratory productivity.

Embodiments of the disclosure can be used to improve many analytical techniques that measure volatile compounds, such as by GC and GCMS. In particular, EPA Methods 502.3, 524.3, 8260C, and others would benefit greatly, as current methods suffer from decreased accuracy at the lower levels of detection and, in some situations, barely achieve the sensitivity required. The use of embodiments of the disclosure, such as system 100, to focus a sample coming from a Purge & Trap prior to injection into the chemical analyzer, such as a GC, means that the normal 30:1 split would no longer be needed to get a rapid injection, so detection limits using system 100 or 300 could be lowered a full 30 times, which is a huge increase in sensitivity over current analyzers. The described VASE technique could be used in place of Purge & Trap for water analysis to improve on performance and simplify system design and maintenance over Purge & Trap systems, with a likewise 4-40× increase in sensitivity depending on how much water is analyzed. Larger volume loop injection systems that use loops between 0.25-5 cc can be too large to inject directly to a capillary GC, but could be focused using system 100 to provide rapid injection rates without using conventional liquid nitrogen refocusing. Whole air sampling containers such as Tedlar bags or canisters can be analyzed by drawing 1-50 cc through the focusing trap, allowing detection limits to drop down significantly while eliminating CO2 and water prior to injection. Many food and flavor applications would be enhanced where compounds boiling from −50 C to +100 C could be focused without having to split away most of the sample upon injection. Considering olfactory detection limits can reach the low part per trillion levels for many important odor and aroma compounds, a splitless injection technique that focuses these compounds while eliminating excess moisture from the sample would allow Flavor Chemists, Wine and Beer Chemists, Fragrance Chemists and many others to be able to quantify down to levels never before possible. Embodiments of the disclosure could also couple to existing dynamic headspace systems to allow additional focusing prior to injection. Reaching lower detection limits with better precision and accuracy is always the goal for new analytical techniques, and the embodiments of the disclosure offer a big leap in that direction.

Thus, systems 100 and 300 and method 400 described above concentrate and enrich a sample prior to analysis, while removing water, carbon dioxide, and air prior to transferring the sample to chemical separation column 124 or 324. Systems 100 and 300 do not require any components that cool the system to subambient temperatures (e.g., 20° C. and lower), such as cryogenic focusers, refrigerant-based cooling systems, Sterling coolers, Peltier coolers or other electronic cooling devices.

As such, the embodiments described above provide a system and method for trapping and focusing a sample prior to chemical analysis, without, in some embodiments, the need for a split injection.

In some embodiments, a chemical analysis system, comprises a valve system, a dewpoint control zone, the dewpoint control zone comprising a tube having a first end and a second end, wherein the first end of the dewpoint control zone tube is fluidly coupled to a sample source and the second end of the dewpoint control zone is coupled to the valve system, a multi-capillary column trapping system (MCCTS), the MCCTS comprising a first end and a second end, the first end of the MCCTS fluidly coupled to the valve system, a chemical separation column having a first end and a second end, the first end of the chemical separation column fluidly coupled to the valve system, and a detector coupled to the second end of the chemical separation column, wherein the valve system is configured to: during a first time period, couple the second end of the dewpoint control zone tube to the first end of the MCCTS, and during a second time period after the first time period, couple the first end of the MCCTS to the chemical separation column. Additionally or alternatively, in some embodiments, during the first time period, the sample flows in a forward direction that is from the first end of the dewpoint control zone to the second end of the MCCTS, and during the second time period, the sample flows in a reverse direction that is from the second end of the MCCTS to the first end of the MCCTS. Additionally or alternatively, in some embodiments, during the first time period, the dewpoint control zone is at a temperature in the range of 25 to 35 degrees Celsius and the MCCTS is at a temperature that is greater than the temperature of the dewpoint control zone by 5 to 10 degrees Celsius, and during the second time period, the MCCTS is at a temperature in the range of 100 to 300 degrees Celsius. Additionally or alternatively, in some embodiments, the chemical analysis system is configured to operate at a temperature at or above 25 degrees Celsius. Additionally or alternatively, in some embodiments, the chemical analysis system does not include a means for cooling any part of the system to sub-ambient temperatures. Additionally or alternatively, in some embodiments, the MCCTS comprises: a first capillary column having a first end that is at the first end of the MCCTS and a second end, the first capillary column having a first affinity for one or more compounds of the sample; and a second capillary column having a first end that is fluidly coupled to the second end of the first capillary column and a second end that is at the second end of the MCCTS, the second capillary column having a second affinity for the one or more compounds of the sample that is greater than the first affinity for the one or more compounds of the sample. Additionally or alternatively, in some embodiments, the chemical analysis system further comprises a thermal desorption device configured to retain the sample source, the thermal desorption device configured to provide the fluid coupling between the sample source and the first end of the dewpoint control zone. Additionally or alternatively, in some embodiments, the tube of the dewpoint control zone comprises an inert capillary tube. Additionally or alternatively, in some embodiments, during the first time period, a relative humidity of the dewpoint control zone is higher than a relative humidity of the MCCTS. Additionally or alternatively, in some embodiments, while retained by the sample source, the sample includes a first amount of water vapor, and while retained by the MCCTS, the sample includes a second amount of water that is less than the first amount of water vapor.

In some embodiments, a method comprises condensing, in a tube of a dewpoint control zone of a chemical analysis system, a portion of water included in a chemical sample; during a first time period, transferring one or more compounds of the chemical sample from a sample source to the capillary tube of the dewpoint control zone and a multi-capillary column trapping system (MCCTS) of the chemical analysis system; and during a second time period, transferring the one or more compounds of the chemical sample from the MCCTS to a chemical separation column of the chemical analysis system without transferring the portion of the water included in the chemical sample to the chemical separation column. Additionally or alternatively, in some embodiments, the portion of the water included in the chemical sample that condenses in the tube of the dewpoint control zone comprises excess water. Additionally or alternatively, in some embodiments, during the first time period: coupling a second end of the dewpoint control zone to a first end of the MCCTS with a valve system of the chemical analysis system, wherein the chemical sample flows in a forward direction that is from the first end of the MCCTS to a second end of the MCCTS during the first time period; and during the second time period: coupling the first end of the MCCTS to the chemical separation column with the valve system of the chemical analysis system, wherein the chemical sample flows in a reverse direction that is from the second end of the MCCTS to the first end of the MCCTS during the second time period. Additionally or alternatively, in some embodiments, the MCCTS comprises: a first capillary column having a first end that is at the first end of the MCCTS and a second end, the first capillary column having a first affinity for one or more compounds of the sample; and a second capillary column having a first end that is fluidly coupled to the second end of the first capillary column and a second end that is at the second end of the MCCTS, the second capillary column having a second affinity for the one or more compounds of the sample that is greater than the first affinity for the one or more compounds of the sample. Additionally or alternatively, in some embodiments, during the first time period, the dewpoint control zone is at a temperature in the range of 25 to 35 degrees Celsius and the MCCTS is at a temperature that is greater than the temperature of the dewpoint control zone by 5 to 10 degrees Celsius, and during the second time period, the MCCTS is at a temperature in the range of 100 to 300 degrees Celsius. Additionally or alternatively, in some embodiments, the chemical analysis system is at a temperature at or above 25 degrees Celsius while the method is performed. Additionally or alternatively, in some embodiments, the chemical analysis system does not include means for cooling any part of the system to sub-ambient temperatures. Additionally or alternatively, in some embodiments, the method further comprises prior to condensing the portion of the water vapor included in the chemical sample: retaining the chemical sample within a sorbent; and desorbing the chemical sample from the sorbent with a thermal desorber. Additionally or alternatively, in some embodiments, the tube of the dewpoint control zone comprises an inert capillary tube. Additionally or alternatively, in some embodiments, during the first time period, a relative humidity of the dewpoint control zone is higher than a relative humidity of the MCCTS.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A chemical analysis system, comprising:
a valve system;
a dewpoint control zone, the dewpoint control zone comprising a tube having a first end and a second end, wherein the first end of the dewpoint control zone tube is fluidly coupled to a sample source and the second end of the dewpoint control zone is coupled to the valve system;
a multi-capillary column trapping system (MCCTS), the MCCTS comprising a first end and a second end, the first end of the MCCTS fluidly coupled to the valve system;
a chemical separation column having a first end and a second end, the first end of the chemical separation column fluidly coupled to the valve system; and
a detector coupled to the second end of the chemical separation column, wherein the valve system is configured to:
during a first time period, couple the second end of the dewpoint control zone tube to the first end of the MCCTS, wherein, during the first time period, the sample flows in a forward direction that is from the first end of the dewpoint control zone to the second end of the MCCTS; and
during a second time period after the first time period, couple the first end of the MCCTS to the chemical separation column, wherein during the second time period, the sample flows in a reverse direction that is from the second end of the MCCTS to the first end of the MCCTS.

2. The chemical analysis system of claim 1, wherein:
during the first time period, the dewpoint control zone is at a temperature in the range of 25 to 35 degrees Celsius and the MCCTS is at a temperature that is greater than the temperature of the dewpoint control zone by 5 to 10 degrees Celsius, and
during the second time period, the MCCTS is at a temperature in the range of 100 to 300 degrees Celsius.

3. The chemical analysis system of claim 1, wherein the chemical analysis system is configured to operate at a temperature at or above 25 degrees Celsius.

4. The chemical analysis system of claim 1, wherein the chemical analysis system does not include a means for cooling any part of the system to sub-ambient temperatures.

5. The chemical analysis system of claim 1, wherein the MCCTS comprises:
- a first capillary column having a first end that is at the first end of the MCCTS and a second end, the first capillary column having a first affinity for one or more compounds of the sample; and
- a second capillary column having a first end that is fluidly coupled to the second end of the first capillary column and a second end that is at the second end of the MCCTS, the second capillary column having a second affinity for the one or more compounds of the sample that is greater than the first affinity for the one or more compounds of the sample.

6. The chemical analysis system of claim 1, further comprising:
- a thermal desorption device configured to retain the sample source, the thermal desorption device configured to provide the fluid coupling between the sample source and the first end of the dewpoint control zone.

7. The chemical analysis system of claim 1, wherein the tube of the dewpoint control zone comprises an inert capillary tube.

8. The chemical analysis system of claim 1, wherein:
- during the first time period, a relative humidity of the dewpoint control zone is higher than a relative humidity of the MCCTS.

9. The chemical analysis system of claim 1, wherein:
- while retained by the sample source, the sample includes a first amount of water vapor, and
- while retained by the MCCTS, the sample includes a second amount of water that is less than the first amount of water vapor.

10. A method comprising:
- condensing, in a tube of a dewpoint control zone of a chemical analysis system, a portion of water included in a chemical sample;
- during a first time period:
  - transferring one or more compounds of the chemical sample from a sample source to the capillary tube of the dewpoint control zone and a multi-capillary column trapping system (MCCTS) of the chemical analysis system; and
  - coupling a second end of the dewpoint control zone to a first end of the MCCTS with a valve system of the chemical analysis system, wherein the chemical sample flows in a forward direction that is from the first end of the MCCTS to a second end of the MCCTS during the first time period; and
- during a second time period:
  - transferring the one or more compounds of the chemical sample from the MCCTS to a chemical separation column of the chemical analysis system without transferring the portion of the water included in the chemical sample to the chemical separation column; and
  - coupling the first end of the MCCTS to the chemical separation column with the valve system of the chemical analysis system, wherein the chemical sample flows in a reverse direction that is from the second end of the MCCTS to the first end of the MCCTS during the second time period.

11. The method of claim 10, wherein the portion of the water included in the chemical sample that condenses in the tube of the dewpoint control zone comprises excess water.

12. The method of claim 1, wherein the MCCTS comprises:
- a first capillary column having a first end that is at the first end of the MCCTS and a second end, the first capillary column having a first affinity for one or more compounds of the sample; and
- a second capillary column having a first end that is fluidly coupled to the second end of the first capillary column and a second end that is at the second end of the MCCTS, the second capillary column having a second affinity for the one or more compounds of the sample that is greater than the first affinity for the one or more compounds of the sample.

13. The method of claim 10, wherein:
- during the first time period, the dewpoint control zone is at a temperature in the range of 25 to 35 degrees Celsius and the MCCTS is at a temperature that is greater than the temperature of the dewpoint control zone by 5 to 10 degrees Celsius, and
- during the second time period, the MCCTS is at a temperature in the range of 100 to 300 degrees Celsius.

14. The method of claim 10, wherein the chemical analysis system is at a temperature at or above 25 degrees Celsius while the method is performed.

15. The method of claim 10, wherein the chemical analysis system does not include means for cooling any part of the system to sub-ambient temperatures.

16. The method of claim 10, further comprising:
- prior to condensing the portion of the water vapor included in the chemical sample:
  - retaining the chemical sample within a sorbent; and
  - desorbing the chemical sample from the sorbent with a thermal desorber.

17. The chemical analysis system of claim 1, wherein the tube of the dewpoint control zone comprises an inert capillary tube.

18. The method of claim 10, wherein:
- during the first time period, a relative humidity of the dewpoint control zone is higher than a relative humidity of the MCCTS.

* * * * *